United States Patent
Blomstedt

(10) Patent No.: US 7,837,417 B2
(45) Date of Patent: Nov. 23, 2010

(54) CERAMIC CUTTING INSERT AND A METHOD OF MANUFACTURING A CERAMIC CUTTING INSERT

(75) Inventor: Per Blomstedt, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 652 days.

(21) Appl. No.: 11/638,702

(22) Filed: Dec. 14, 2006

(65) Prior Publication Data

US 2007/0183858 A1 Aug. 9, 2007

(30) Foreign Application Priority Data

Dec. 27, 2005 (SE) .................................. 0502929

(51) Int. Cl.
  *B23B 27/14* (2006.01)
  *B23B 27/22* (2006.01)
  *B23C 5/22* (2006.01)
(52) U.S. Cl. .................................... 407/113; 407/114
(58) Field of Classification Search .......... 407/113–116
  See application file for complete search history.

(56) References Cited

U.S. PATENT DOCUMENTS

| | | | | |
|---|---|---|---|---|
| 3,407,467 A | * | 10/1968 | Wirfelt | 407/114 |
| 4,116,576 A | * | 9/1978 | Gawryk, Sr. | 407/114 |
| 4,597,696 A | * | 7/1986 | Maeda et al. | 407/114 |
| 4,963,061 A | | 10/1990 | Katbi et al. | |
| 5,476,025 A | * | 12/1995 | Beeghly et al. | 82/1.11 |
| 5,628,590 A | * | 5/1997 | Beeghly et al. | 407/114 |
| 5,725,334 A | * | 3/1998 | Paya | 407/117 |
| 5,758,994 A | * | 6/1998 | Hintze et al. | 407/116 |
| 5,904,450 A | * | 5/1999 | Satran et al. | 407/113 |
| 6,241,430 B1 | * | 6/2001 | Norstrom | 407/114 |
| 7,494,302 B2 | * | 2/2009 | Ishida | 407/113 |

* cited by examiner

*Primary Examiner*—Boyer D Ashley
*Assistant Examiner*—Sara Addisu
(74) *Attorney, Agent, or Firm*—Drinker Riddle & Reath LLP

(57) ABSTRACT

A ceramic cutting insert, including a face ground top surface, and at least one peripheral clearance surface adjacent to an edge, from which a reinforcing chamfer surface extends inward. The chamfer surface forms a first acute angle with a reference plane that is parallel to the top surface. A generally concave unground intermediate surface is formed between the top surface and the chamfer surface, the intermediate surface at the transition to the top surface forming a second angle with the top surface that is greater than the first angle, and the width of the chamfer surface being greater than the width of the intermediate surface.

7 Claims, 3 Drawing Sheets

CERAMIC CUTTING INSERT AND A METHOD OF MANUFACTURING A CERAMIC CUTTING INSERT

This application claims priority under 35 U.S.C. §119 to Sweden Patent Application No. 0502929-3, filed on Dec. 27, 2005, the disclosure of which is incorporated by reference herein in its entirety.

FIELD OF THE INVENTION

The present invention relates generally to a ceramic cutting insert of the type that includes a face ground, upper surface, and at least one peripheral clearance surface adjacent to an edge from which a reinforcing chamfer surface extends inward, which forms an acute angle with a reference plane parallel to the top surface. The present invention also relates to a method for the manufacture of such ceramic cutting inserts.

BACKGROUND OF THE INVENTION

Within the modern technique of chip removing machining, tools having replaceable wear parts in the form of cutting inserts are mostly used, which are mounted in form-fitted seatings or insert seats in different basic bodies that are suitable for, e.g., milling, drilling and turning, respectively. Generally, the cutting inserts are manufactured from a material that is considerably harder and more wear-resistant than the material of the basic bodies, such as steel, aluminum and the like. For the applications and machining methods that through the years have been developed to efficiently machine myriads of details of most varying materials, in particular metallic materials, there have been provided cutting inserts of a range of different materials that have their individual advantages and disadvantages for the various applications. A dominant material of the cutting inserts is cemented carbide, which is an overall denomination of such powder metallurgical products that are built up from a number of hard carbides (wolfram carbide, titanium carbide, tantalum carbide, niobium carbide) in a binder metal (usually cobalt). Cutting inserts formed of cemented carbide have generally good properties in respect of hardness in combination with a certain toughness (imparted by the binder metal), which among other things, means that the cutting inserts may be constructed fairly freely in a most varying geometrical shape.

However, for certain applications, cemented-carbide inserts are unsuitable, for instance, as a consequence of the limited hot hardness of the cemented carbide, i.e., the capability of the material to retain its hardness at high temperatures. During machining of certain types of metals, and under certain outer conditions, extreme heat is generated upon the chip removal, which tends to make cemented-carbide inserts less suitable for their purpose. However, in such cases, ceramic cutting inserts can often be used in a successful way. The ceramic material and the cemented carbide have, per se, certain common properties, but also differ from each other in several important respects. Thus, compared with cemented-carbide inserts, the ceramic cutting inserts have a considerably greater hardness and better hot hardness. Therefore, the ceramic cutting inserts usually have a long service life and can operate at extraordinary high temperatures, as well as with a very high cutting capacity. However, the ceramic cutting inserts are fairly brittle such that the compression strength is considerably greater than the tensile strength. Furthermore, the surfaces of ceramic cutting inserts are difficult to grind, in particular surfaces having irregular or complex shapes. This limits the tool designer's latitude to decide the geometry of the cutting inserts. Therefore, ceramic cutting inserts have, without exception, a fairly simple basic shape, which mostly has planar and/or rotationally symmetrical surfaces.

As to the geometry of the chip-removing edge of ceramic cutting inserts, two main categories can be distinguished, viz. chamfer-reinforced edges and rounded, so-called ER-edges (ER=Edge Radius), each one of which has its advantages and disadvantages. Rounded edges of the ER-type are found on cutting inserts, the edge of which is formed simply by the transition between a ground top surface and a ground clearance surface at an angle to the same, the edge being given the rounded shape thereof by a simple finishing, such as brushing. Such cutting inserts have the advantage of being comparatively easy-cutting, i.e., exposed only to moderate cutting forces, but the disadvantage of being mechanically weak and thereby inclined to become damaged or break (and therefore have an unpredictable service life). The edge of chamfer-reinforced cutting inserts is provided by grinding a slender chamfer surface in the transition between the top surface and the clearance surface, such that the chamfer surface forms an angle with the top surface as well as the clearance surface. For reasons of grinding technique, this angle (which is defined as the angle between the chamfer surface and an imaginary plane in the extension of the top surface) is traditionally in the range of 15-30°. Most commonly, the angle is approx. 20°. In such a way, a mechanically comparatively strong edge is provided, the resultant of the cutting forces that act against the chamfer surface being directed inward/downward in the cutting insert. Generally, the edge becomes more easy-cutting the smaller the above-mentioned angles are. However, a disadvantage of chamfer-reinforced cutting inserts is that the cutting forces become great, i.e., the cutting insert becomes blunt-cutting.

The fact that the two edge types have so very different properties in the mentioned respects causes problems for the users, in that it is difficult to predetermine which type of cutting inserts should be chosen to give optimal results for a given machining operation. Therefore, there is a need for ceramic cutting inserts, the strength and robustness of which is better than that of the ER-inserts, and the cutting performance of which simultaneously is better than that of the chamfer-reinforced cutting inserts.

U.S. Pat. No. 4,963,061 discloses a ceramic cutting insert that is formed with a chamfer surface adjacent to a clearance surface as well as a subsiding chip-breaking surface, which extends the chamfer surface and a flat upper side of the cutting insert. In this case, however, the chamfer surface has a width that is merely a fraction of the width of the chip-breaking surface, the chamfer surface serving solely as a narrow edge strengthening in the vicinity of a conventional chip breaker. U.S. Pat. No. 4,963,061 does not deal with the technical problem of providing distinct borderlines between a chamfer surface and an upper surface in connection with the grinding of the cutting insert and thereby providing a repeatable shape of the individual cutting inserts.

The present invention aims at providing for the above-mentioned needs and at providing a ceramic cutting insert that is more universally useful than previously known ceramic cutting inserts. Therefore, a primary object of the invention is to provide a ceramic cutting insert that combines the advantages of the ER-inserts and of the chamfer-reinforced cutting inserts, without having the disadvantages thereof. In other words, the edges of the cutting inserts should be both fairly strong and fairly easy-cutting.

Another object of the invention is to provide a ceramic cutting insert that can be made with more complex geometries than previously known ceramic cutting inserts.

Yet another object of the invention is to provide a ceramic cutting insert that has a repeatable exterior even if it is made with geometrically irregular surfaces, such that the border lines between the different surfaces of the cutting inserts always are similar and situated at the same locations, irrespective of variations in manufacture, to give a confident impression on the operator.

SUMMARY OF THE INVENTION

In an embodiment, the invention provides a ceramic cutting insert, including a face ground top surface, and at least one peripheral clearance surface adjacent to an edge, from which a reinforcing chamfer surface extends inward. The chamfer surface forms a first acute angle with a reference plane that is parallel to the top surface. A generally concave unground intermediate surface is formed between the top surface and the chamfer surface, the intermediate surface at the transition to the top surface forming a second angle with the top surface that is greater than the first angle, and the width of the chamfer surface being greater than the width of the intermediate surface.

In another embodiment, the invention provides a method for the manufacture of a ceramic cutting insert, including compression-molding and hardening a powdered, ceramic compound into a blank, which includes at least one generally planar major face, a peripheral clearance surface, a reinforcing chamfer surface adjacent to a chip-removing edge, and an intermediate surface positioned between the chamfer surface and the major face, the intermediate surface being steeper inclined and narrower than the chamfer surface. The method further includes grinding the top surface, which breaks through the intermediate surface where the intermediate surface has a steep angle of inclination; and leaving at least the intermediate surface unground.

In yet another embodiment, the invention provides a ceramic cutting insert, including a face ground top surface, a cutting edge, a peripheral clearance surface adjacent to the cutting edge, a reinforcing chamfer surface extending from the clearance surface and forming a first acute angle with a reference plane that is parallel to the top surface, and a generally concave unground intermediate surface extending between the chamfer surface and the top surface. The intermediate surface forms a second angle with the top surface at a transition to the top surface. The second angle is greater than the first angle. The chamfer surface has a radial width that is greater than a radial width of the intermediate surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
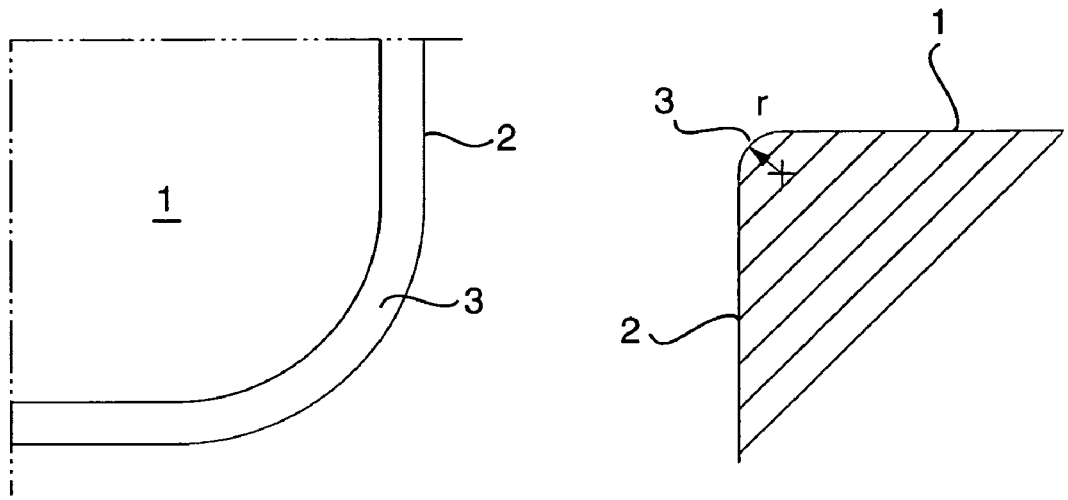
FIG. 1 is a schematic illustration of a prior art ER-edge of a ceramic cutting insert on an extremely enlarged scale.
Figure 2:
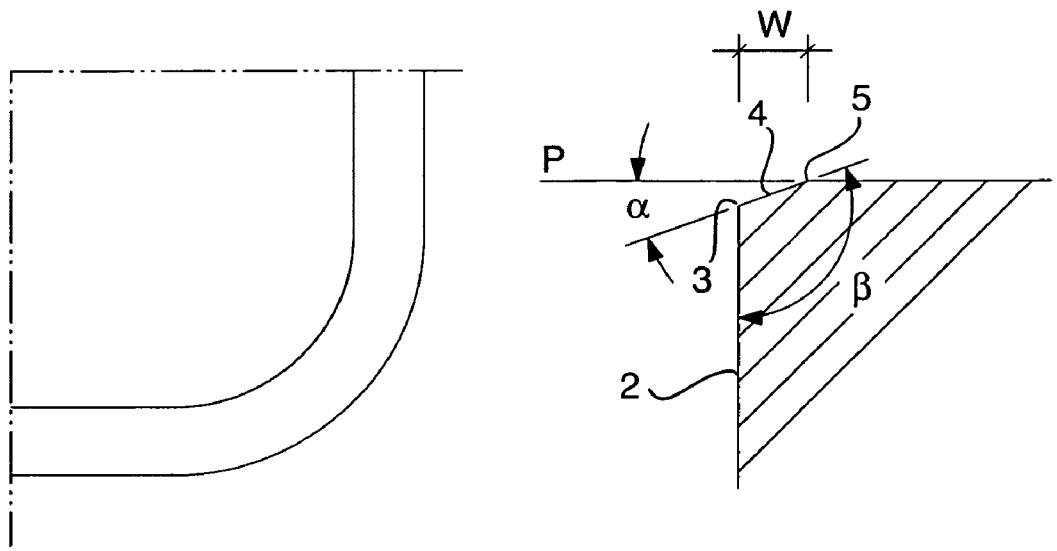
FIG. 2 is an analogous illustration of a prior art chamfer-reinforced edge of a ceramic cutting insert.
Figure 3:
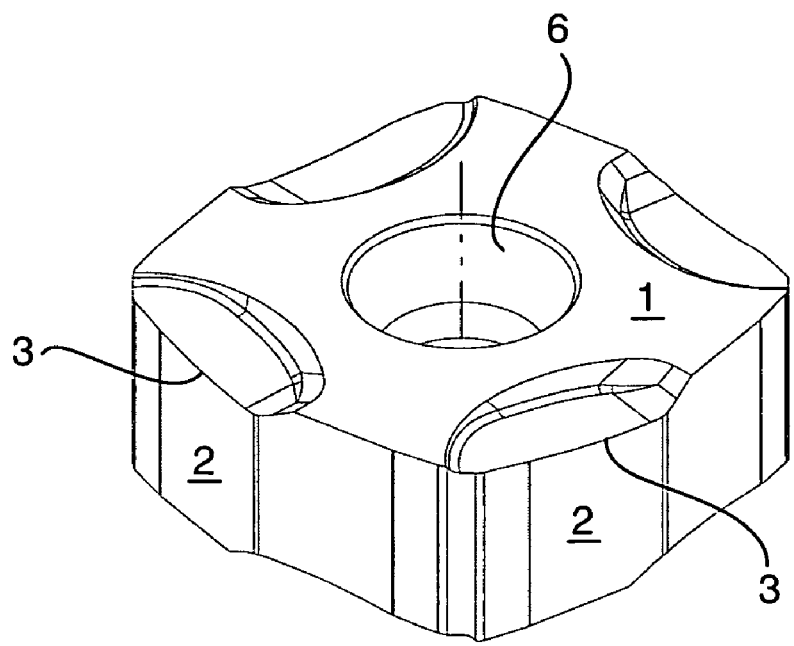
FIG. 3 is a perspective view of a ceramic cutting insert according to an embodiment of the present invention.
Figure 4:
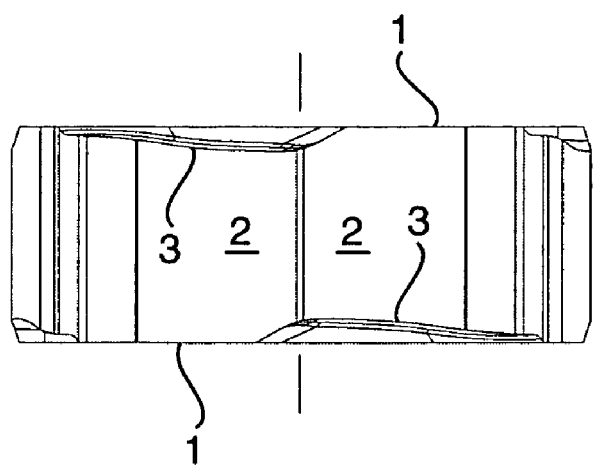
FIG. 4 is a side view of the ceramic cutting insert.

FIGS. 1 and 2 schematically illustrate the design of known ceramic cutting inserts having ER-edges and chamfer-reinforced edges, respectively.

In FIG. 1 an ER-edge is illustrated, which is shown in section, as well as adjacent to a corner of a ceramic cutting insert. The cutting insert has a planar, ground top surface 1, and a likewise ground clearance surface 2, which in this case is planar and oriented at an angle of 90° to the top surface. Between the surfaces 1 and 2, an edge 3 is provided in the form of a rounded surface of radius r. In practice, the radius r may be in the range of 40-60 μm, the surface in question being provided e.g., by brushing the cutting insert after the grinding of the surfaces 1, 2.

In FIG. 2, a chamfer-reinforced cutting insert is illustrated. Also in this case, the top surface 1 and the clearance surface 2 are face ground and generally oriented at an angle of 90° to each other. Adjacent to the edge line 3, a chamfer surface 4 is formed, by grinding, which transforms into the top surface 1 via a border line 5. An imaginary plane in the extension of the top surface 1 is designated P. As previously described, the angle α between the chamfer surface 4 and the plane P usually is approx. 15-30°. In the example, the angle α=20°. The width W of the chamfer surface usually is approx. 0.25 mm. The forming of the chamfer surface 4 is carried out by a grinding operation, which is effected after the surfaces 1, 2 having been ground.

Ceramic cutting inserts of the kind in question are manufactured by pressing and hardening a powdered, ceramic compound, which forms a blank, the actual dimension of which is somewhat greater than the desired nominal dimension of the cutting insert. In other words, the blank is formed having a certain grinding allowance from all sides (in practice, approx. 0.1 mm).

In FIGS. 3-7, a ceramic cutting insert made in accordance with an embodiment of the invention is shown, which includes ground surfaces 1, 2. In order to distinguish the surface 1 from the other surfaces of the cutting insert in terms of the level, the same is henceforth denominated "the top surface." In the example shown, the cutting insert is turnable or double-sided, and therefore not only the topside but also the underside of the cutting insert is formed in the form of a ground surface, which alternately can serve as a support surface for the cutting insert. The surfaces 2 are peripheral and form clearance surfaces adjacent to chip-removing edges 3. In this case, the cutting insert includes four cutting edges 3 and consequently four clearance surfaces 2. A number of facet surfaces and transition surfaces may be interposed between respective clearance surfaces. Like the clearance surfaces 2, all other, peripheral surfaces of the cutting insert may be ground. The ceramic cutting insert in question may—but need not—be formed with a central hole 6 for a tightening screw.

In the example, the cutting insert has a negative basic geometry so that the angle between the top surface and the individual clearance surface is approx. 90°. However, the cutting insert may also have a positive geometry, the angle in question being acute.

Figure 5:
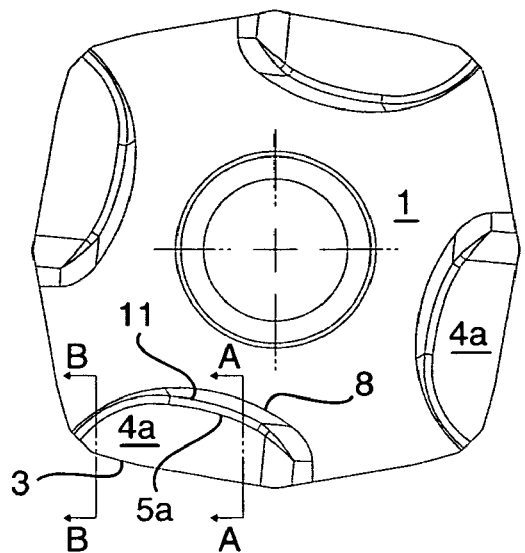
FIG. 5 is a plan view from above of the ceramic cutting insert.
Figure 6:
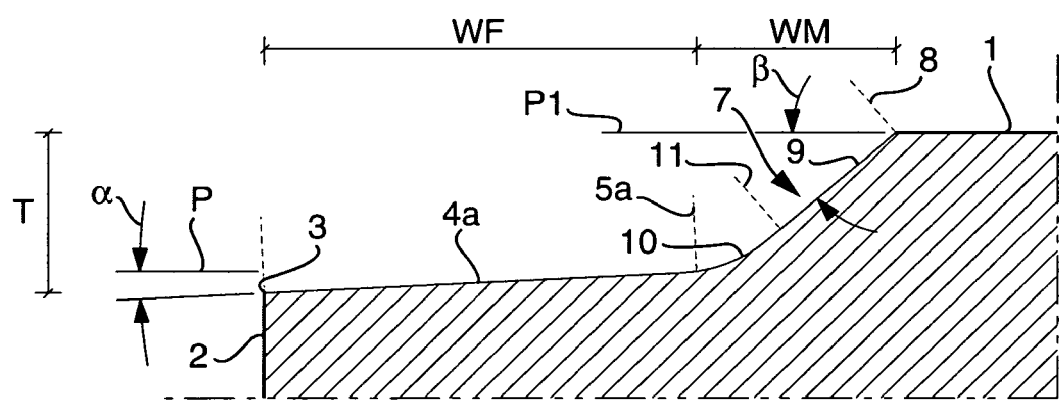
FIG. 6 is an enlarged detailed section A-A in FIG. 5.
Figure 7:
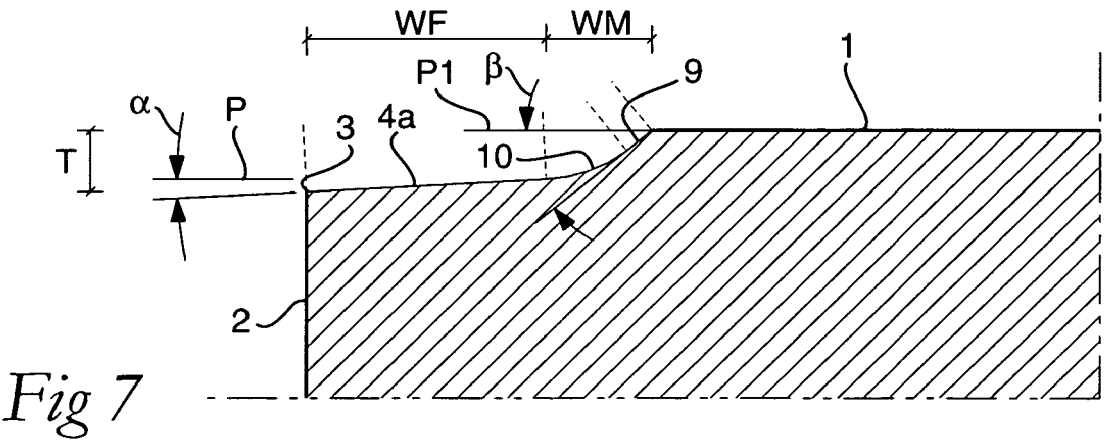
FIG. 7 is an enlarged detailed section B-B in FIG. 5.

FIGS. 5-7 illustrate in enlargement the unique shape of the cutting insert adjacent to the individual cutting edge 3. From the edge 3, a reinforcing chamfer surface 4a extends inward toward the center of the cutting insert, such that the chamfer surface inwardly is delimited by a border line 5a. In the example, the chamfer surface is planar, as shown in FIGS. 6 and 7. However, in contrast to the conventional chamfer surface 4 shown in FIG. 2, the chamfer surface 4a and a reference plane P parallel to the top surface 1 form an angle α of only 3°. In other words, the chamfer surface 4a slopes in a considerably flatter or smaller angle than the traditional chamfer surface 4 according to FIG. 2.

Between the top surface 1 and the border line 5a of the chamfer surface 4a, an intermediate surface in its entirety designated 7 is formed, which transforms into the top surface 1 via a second, inner border line 8 that is situated on a higher level than the first-mentioned border line 5a. In the shown, preferred embodiment, the intermediate surface 7 includes two part surfaces, viz. a planar part surface 9, as well as a concavely arched part surface 10 in the form of a so-called radius transition, which is separated from the planar part surface 9 by a third border line 11. Surface 9 forms an acute angle β with a reference plane P1 that extends in the extension of the top surface 1. The intermediate surface, which in its entirety is designated 7 and includes the part surfaces 9, 10, is generally concave, so that the surface is in its entirety located inside/underneath any imaginary, straight line that extends between the border lines 5a and 8. The intermediate surface 7 may be formed in varying shapes provided that the same is concave. For instance, the surface could be in the form of a single, concavely arched surface, i.e., without any planar part surface, provided that the surface in question, like the illustrated planar part surface 9, forms an angle β that is considerably greater than the angle α. In the example, the angle β is 40°, i.e., a relatively steep angle. In practice, the angle β should be at least five times as large as the angle α, and at least 15° and at most 85°. Advantageously, the angle β may be at least 25° and at most 65°.

The angle α may as well deviate from the exemplified value of 3°. However, the angle α should not be less than 2°, and not exceed 5°. In this way, the desire of an improved strength of the edge portion, as well as the desire that the edge portion should be easy-cutting, are provided for (the strength increases with increasing α, while the cutting forces decrease with decreasing α).

While the top surface 1 and suitably also the clearance surface 2 are ground in accordance with standard manufacturing methods, at least the intermediate surface 7, and preferably also the chamfer surface 4a, are unground. In other words, the surfaces 4a, 7 in all essentials retain the original shape thereof, even if they are after-treated by brushing with the purpose of giving a shiny surface structure, as well as providing an edge rounding of the ER-type along the edge line 3. Thus, by the brushing, possible chips are removed that may remain after the grinding of the clearance surface 2, the used brush being sufficiently strong so as to provide a certain radius along the edge line. This radius may be as moderate as 20 μm and should not exceed 40 μm. However, in contrast to the grinding, the brushing does not effect any material-removal in the surface layer of the cutting insert other than in the vicinity of the edge line.

In FIGS. 6 and 7, WF designates the width of the chamfer surface 4a, while WM designates the width of the intermediate surface 7 (in projection). The width WM of the intermediate surface is smaller than the width WF of the chamfer surface 4a. For example, for a 15 mm cutting insert (IC=15 mm), the width WF of the chamfer surface may be 1.5 mm, while the width WM of the intermediate surface may be 0.8 mm. In doing so, the depth T (defined as the vertical distance between the edge 3 and the reference plane P1) may be approx. 0.7 mm. The width of the surfaces 4a, 7 successively decreases from the section A-A to the section B-B, without the relation between the width dimensions WF and WM radically being altered. On the other hand, the width of the part surface 9 in relation to the width of the part surface 10 is decreased, i.e. the width WF of the chamfer surface is greater than the width WM of the intermediate surface in arbitrary sections (A-A and B-B respectively) along the length extension of the surfaces.

The manufacture of the ceramic cutting insert is carried out in the following way: In a first step, a powdered, ceramic compound is compression-molded and hardened (sintered) into a blank. The pressing is carried out in a mold that generates two generally planar and parallel major faces, which later form the surfaces 1 of the cutting insert. Furthermore, a peripheral clearance surface and a reinforcing chamfer surface adjacent to each cutting edge should be formed in the blank. Furthermore, an intermediate surface 7 of the type described above should be formed. When the blank has the desired hardness, not only the side surfaces, but also each major face are ground while forming a completed, planar surface 1. Upon grinding, the grinding disc will break through the surface 9 while forming the border line 8. Because the surface 9 has a comparatively steep angle of inclination β, the border line 8 will become distinct (as viewed in the projection from above) and will be located in a predetermined position, even if the surface 9 includes minor irregularities, e.g., streaks of long narrow depressions that extend up to the border line 8. In such a way, the intermediate surface 7, as well as the reinforcing chamfer surface 4a, may be left unground, without the exterior of the cutting insert being impaired in an aesthetic respect.

In this connection, the attention is directed to the alternative that the grinding be made in direct connection to the flatly sloping chamfer surface 4a, which in the example has an angle of inclination α of only 3°. In case the grinding disc would be allowed to break through directly in such a chamfer surface, the position of the border line in relation to the edge line 3 would vary between different cutting inserts because of thickness variations between different production outcomes.

When the surfaces 1, 2 have been ground, suitably the cutting insert is completed by brushing the chamfer and intermediate surfaces 4a, 7 while forming an ER-rounded edge line 3.

One of the advantages of the ceramic cutting insert according to the invention is that the cutting insert becomes more universally useful for various applications. Instead of continually needing to change between ER-ground cutting inserts and chamfer-reinforced cutting inserts, respectively, in many applications the user can use tools equipped with one and the same type of cutting inserts. Another advantage is that the requisite chamfer surfaces adjacent to the cutting edges may be realized by direct pressing, i.e., without grinding. This entails a greater latitude for the tool designer to form surfaces having a complex shape adjacent to the cutting edges. An additional advantage is that the cutting insert can be produced in an aesthetically attractive and reassuring manner, in spite of the surfaces between the face ground top surface and the individual, ground clearance surface being made without being ground. Thus, due to the steep inclination of the intermediate surface, one and the same width of the surface that extends from the edge to the top surface is obtained with reliable repeatability, even if the surface has irregularities. It should be emphasized that the intermediate surface formed in accordance with an embodiment of the invention is not intended to serve as a chip breaker. Hence, in the applications for which the ceramic cutting insert is suitable, the chip will primarily be broken already against the chamfer surface positioned closest to the edge line.

The invention is not limited only to the embodiments described above and shown in the drawings. Thus, it is feasible to make the chamfer surface positioned closest to the edge and the intermediate surface positioned closest to the top surface in the form of parts of a single, continuous, concavely arched surface without any marked turning or border line between the part surfaces. For instance, such a surface could cross-section-wise be defined by an arched line, the radius of curvature of which is comparatively great closest to the edge and then successively decreasing toward the top surface. In general, the shape of the unground surface between the edge line and the border line to the top surface is incidental provided that the surface is generally concave, i.e., located under an imaginary plane between the edge line and the border line, at the same time as the part surface (the intermediate surface) positioned closest to the top surface slopes at a considerably greater angle than the part surface (the chamfer surface) positioned closest to the edge line.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A ceramic cutting insert, comprising: a face ground top surface, and at least one peripheral clearance surface adjacent to an edge, from which a reinforcing chamfer surface extends inward, the chamfer surface forming a first acute angle with a reference plane that is parallel to the top surface, wherein a generally concave unground intermediate surface is formed between the top surface and the chamfer surface, the intermediate surface at the transition to the top surface forming a second angle with the top surface that is greater than the first angle, and the width of the chamfer surface being greater than the width of the intermediate surface, wherein the reinforcing chamfer surface and the concave intermediate surface extend continuously upward from the edge to the top surface.

2. The ceramic cutting insert according to claim 1, wherein the intermediate surface includes two part surfaces, at least one of which is planar and the other of which is concave.

3. The ceramic cutting insert according to claim 1, wherein the second angle is at least five times as large as the first angle.

4. The ceramic cutting insert according to claim 1, wherein the first angle is at least 2° and at most 5°.

5. The ceramic cutting insert according to claim 1, wherein the edge is rounded into a radius of curvature of at most 40 μm.

6. The ceramic cutting insert according to claim 1, wherein the cutting insert is turnable by comprising two opposite, face ground surfaces, which are parallel and individually transform into at least one unground intermediate surface and a connecting chamfer surface.

7. A ceramic cutting insert, comprising:
a face ground top surface;
a cutting edge;
a peripheral clearance surface adjacent to the cutting edge;
a reinforcing chamfer surface extending from the clearance surface and forming a first acute angle with a reference plane that is parallel to the top surface; and
a generally concave unground intermediate surface extending between the chamfer surface and the top surface, the intermediate surface forming a second angle with the top surface at a transition to the top surface, the second angle being greater than the first angle, the chamfer surface having a radial width that is greater than a radial width of the intermediate surface,
wherein the reinforcing chamfer surface and the concave intermediate surface extend continuously upward from the cutting edge to the top surface.

* * * * *